(12) United States Patent
Iwanami et al.

(10) Patent No.: US 10,906,455 B2
(45) Date of Patent: Feb. 2, 2021

(54) LEVER SWITCH MOUNTED ON A VEHICLE

(71) Applicant: TOYO DENSO KABUSHIKI KAISHA, Minato-ku (JP)

(72) Inventors: Masayuki Iwanami, Hidaka (JP); Takatoshi Komatsu, Hikone (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/725,560

(22) Filed: Dec. 23, 2019

(65) Prior Publication Data

US 2020/0282899 A1 Sep. 10, 2020

(30) Foreign Application Priority Data

Mar. 7, 2019 (JP) ................... 2019-041776

(51) Int. Cl.
  *B60Q 1/34* (2006.01)
  *H01H 3/04* (2006.01)
  *H01H 9/02* (2006.01)

(52) U.S. Cl.
  CPC .............. *B60Q 1/343* (2013.01); *H01H 3/04* (2013.01); *H01H 9/02* (2013.01); *H01H 2009/0278* (2013.01); *H01H 2231/026* (2013.01)

(58) Field of Classification Search
  CPC ............. B60Q 1/343; H01H 3/04; H01H 9/02

USPC ....................................................... 200/61.27
See application file for complete search history.

(56) References Cited

U.S. PATENT DOCUMENTS 5,739,751 A * 4/1998 Ishihara ............... B60Q 1/1469
340/475

FOREIGN PATENT DOCUMENTS

| JP | 10-64371 | 3/1998 | |
| JP | 2000-149716 | 5/2000 | |
| JP | 2000149716 | * 5/2000 | ............... B60Q 1/42 |

* cited by examiner

*Primary Examiner* — Nguyen Tran
*Assistant Examiner* — Iman Malakooti
(74) *Attorney, Agent, or Firm* — Cozen O'Connor

(57) ABSTRACT

To provide a lever switch that reduces collision sound when a switch moving body rotates while reducing the number of parts. A click feeling generator is made integrally of an elastic member and disposed inside a third case. An operation lever is operated to rotate the switch moving body with respect to the third case. The click feeling generator includes clicking surfaces that abut on a tip end of the switch moving body to impart a click feeling, a shoulder portion, and a low rigidity portion. A corner portion of the switch moving body in the rotation direction abuts on the corresponding low rigidity portion to limit a rotation range of the switch moving body.

8 Claims, 5 Drawing Sheets

LEVER SWITCH MOUNTED ON A VEHICLE

BACKGROUND OF THE INVENTION

Field of the Invention

The present invention relates to a lever switch mounted on a vehicle or the like.

Description of the Related Art

Conventionally, a lever switch mounted on a vehicle or the like has been known, in which a switch moving body rotates by operating an operation lever and abuts on a clicking surface of a click feeling generator to generate a click feeling (see Japanese Laid-open Patent Publication (Kokai) No. 2000-149716 and Japanese Laid-open Patent Publication (Kokai) No. H10-64371). In this type of the lever switch, a rotation range is limited as corner portions of the switch moving body abut on the inside of a case or the like in a rotating direction. When the corner portions abut on the inside of the case or the like, collision sound is generated. In order to decrease such collision sound, Japanese Laid-open Patent Publication (Kokai) No. 2000-149716 discloses a shock absorber abutted by a bracket (switch moving body) is formed integrally with the case. Further, Japanese Laid-open Patent Publication (Kokai) No. H10-64371 discloses an elastic member provided in the switch moving body or the case.

However, the shock absorber of Japanese Laid-open Patent Publication (Kokai) No. 2000-149716 is formed integrally with the case and should be made of a highly rigid material. Therefore, it is difficult to decrease the collision sound when the bracket abuts on the shock absorber. In Japanese Laid-open Patent Publication (Kokai) No. H10-64371, the elastic member is provided separately, so that the number of parts increases.

SUMMARY OF THE INVENTION

The present invention provides a lever switch that reduces collision sound during rotation of a switch moving body, while reducing the number of parts.

Accordingly, one aspect of the present invention provides a lever switch including a case, a click feeling generator that is disposed inside the case and made of an elastic member, and a switch moving body that is disposed inside the click feeling generator and rotates with respect to the case by operating an operation lever, in which the click feeling generator includes a clicking surface abutting on a tip end of the switch moving body and imparting a click feeling, a shoulder portion formed at an inner end of the click feeling generator, and a low rigidity portion formed between the shoulder portion and the clicking surface, and a corner portion of the switch moving body located in a rotating direction thereof abuts on the low rigidity portion to limit a rotation range of the switch moving body.

According to the embodiment of the present invention, the collision sound at the time of rotation of a switch moving body can be reduced, while reducing the number of parts.

Further features of the present invention will become apparent from the following description of exemplary embodiments (with reference to the attached drawings).

DESCRIPTION OF THE EMBODIMENTS

Hereinafter, embodiments of the present invention will be described with reference to the accompanying drawings.

Figure 1:
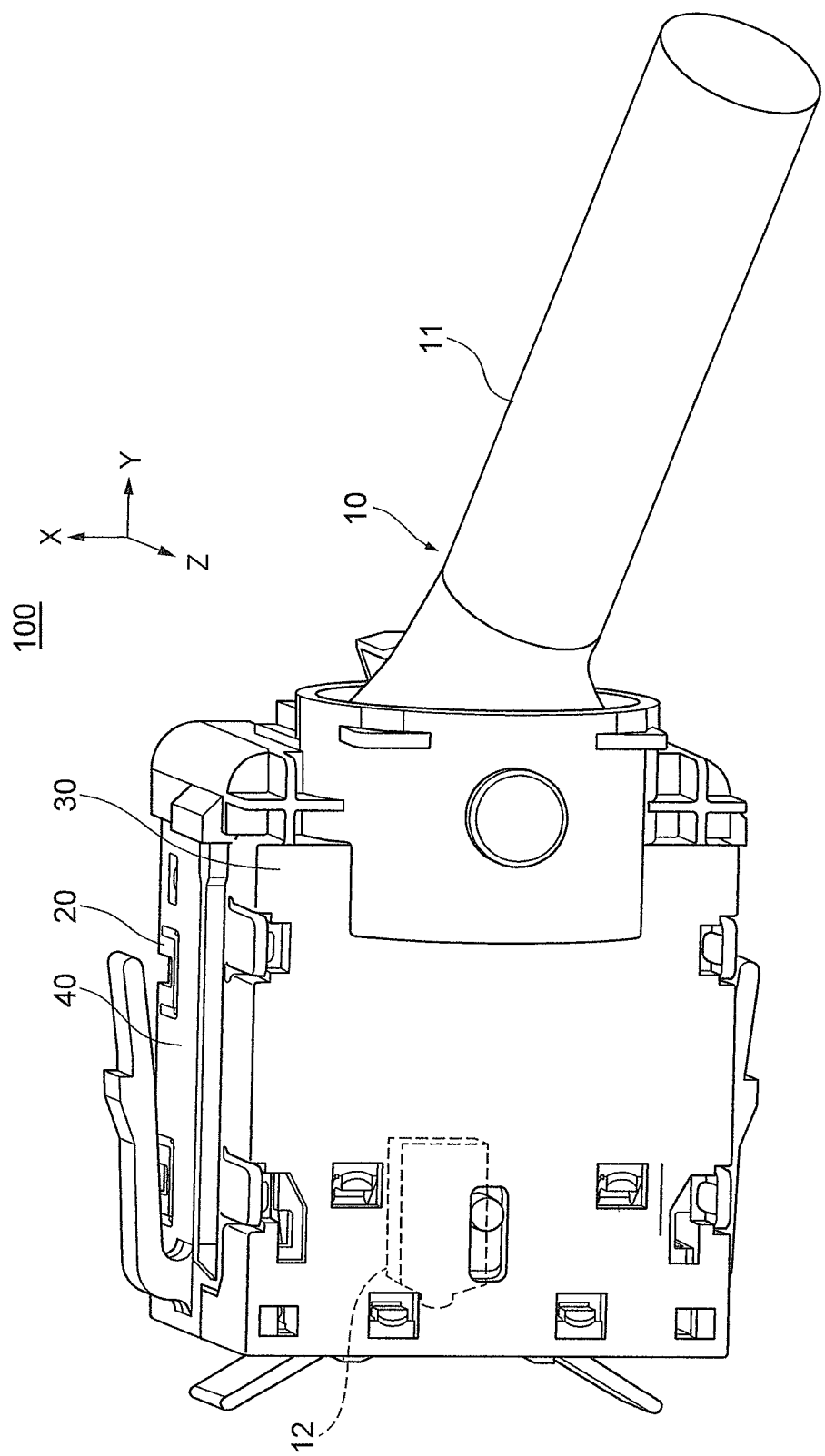
FIG. 1 is a perspective view of a lever switch.

FIG. 1 is a perspective view of a lever switch according to an embodiment of the present invention. A lever switch 100 is mounted, for example, on a vehicle or the like, as a component for a direction indicating operation. A housing of the lever switch 100 is box-shape and mainly includes a first case 20, a second case 30, and a third case 40. A lever body 10 is disposed rotatably with respect to the housing of the lever switch 100. The lever body 10 mainly includes an operation lever 11 and a switch moving body 12. The operation lever 11 is rotated by the user. Hereinafter, orientations are defined according to an XYZ coordinate system in FIG. 1.

Figure 2:
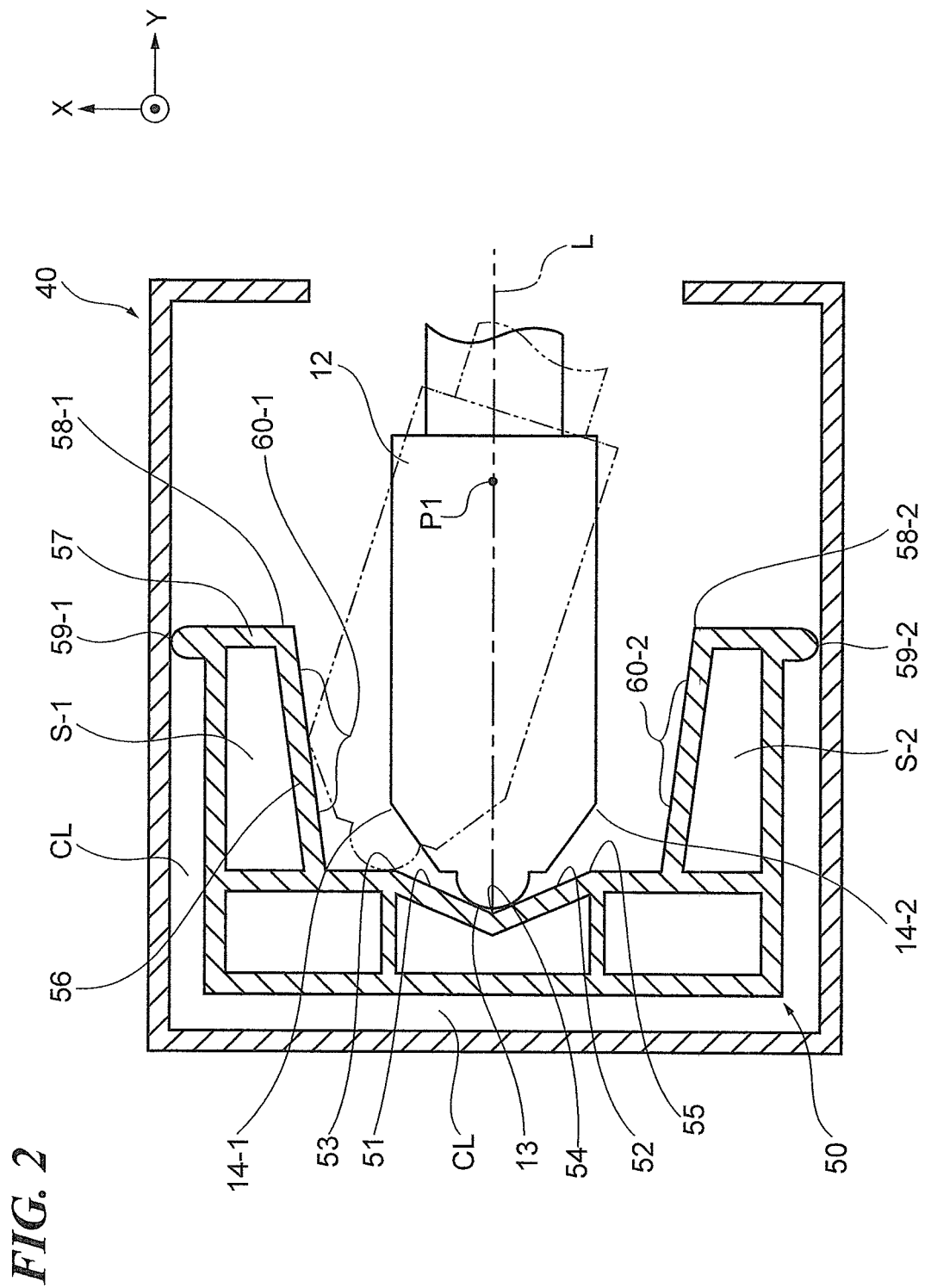
FIG. 2 is a schematic cross-sectional view of main components in a housing when viewed in a Z-direction.

FIG. 2 is a schematic cross-sectional view of main components in the housing of the lever switch 100 when viewed in the Z-direction. FIG. 2 illustrates a click feeling generator 50 in addition to the third case 40 and the switch moving body 12. It should be noted that FIG. 2 schematically illustrates the components for a better understanding of the invention. In FIG. 2, therefore, some portions not relevant to the essence of the present invention may be formed in different shapes or with dimensions from those shown in FIG. 1.

The lever body 10 is rotatable as a whole about a rotation center P1. The rotation center P1 is substantially parallel to the Z-axis. Actually, the lever body 10 is rotatable by the engagement of a shaft and a bearing provided on one side and the other side of the housing (at least one of the cases 20, 30, and 40) and the lever body 10. Assume that a virtual straight line L passes through the rotation center P1 and a tip end 13 of the switch moving body 12. In the lever body 10, the operation lever 11 and the switch moving body 12 are connected via a coil spring and other intervening members (both of which are not illustrated). A user operates the operation lever 11 to rotate the switch moving body 12. Further, the switch moving body 12 can be elastically moved along the virtual straight line L relative to the operation lever 11 due to the elasticity of the coil spring.

The click feeling generator 50 is disposed inside the substantially box-shaped third case 40. It should be noted that the click feeling generator 50 is fixed engaged with the second case 30 shown in FIG. 1. The click feeling generator 50 is in a substantially reversed C-shape when viewed in the Z-direction. The third case 40 is made of resin. The click feeling generator 50 is made integrally of an elastic member having higher elasticity than the third case 40. The material of the click feeling generator 50 is, for example, an elastomer, but other elastic members may be used. The switch moving body 12 is disposed inside the click feeling generator 50. The click feeling generator 50 is disposed in the third case 40 with a clearance CL. The click feeling generator 50 has a protrusion 59-1 and a protrusion 59-2 on the outside on the +X side and the −X side, respectively. The click feeling generator 50 abuts on the third case 40 at the protrusions 59-1 and 59-2. It should be noted that both the protrusion 59-1 and the protrusion 59-2 are long protrusions in the X direction and are in line contact with the third case 40.

clicking surfaces 51 and 52 are formed inside the click feeling generator 50 facing the tip end 13 of the switch moving body 12 to abut on the tip end 13 and impart a click feeling. A valley portion 54 is formed between the clicking surfaces 51 and 52. The clicking surface 51 has a peak portion 53 and the clicking surface 52 has a peak portion 55. The tip end 13 elastically abuts the clicking surfaces 51 and 52 by the elasticity of the coil spring. Therefore, along with the rotational displacement of the switch moving body 12, the tip end 13 slides on the clicking surfaces 51 and 52, while being elastically displaced along the virtual straight line L by the elasticity of the coil spring. The click feeling is generated when the tip end 13 passes through the valley portion 54 or climbs over the peak portions 53 and 55.

The switch moving body 12 is rotatable bidirectionally (+X direction, −X direction) from a neutral position. The position where the tip end 13 faces the valley portion 54 is the neutral position of the switch moving body 12 (the switch moving body 12 at the neutral position is indicated by a solid line). A rotation end position in the +X direction (clockwise direction in FIG. 2) of the switch moving body 12 corresponds to a right turn indicating position (the switch moving body 12 at the rotation end position is indicated by a dotted line), while the rotation end position in the −X direction corresponds to a left turn indicating position. The virtual straight line L in the neutral state of the switch moving body 12 is substantially parallel to the Y-axis.

Inner ends of the click feeling generator 50 on the +X side and the −X side are referred to as a shoulder portion 58 (58-1, 58-2). The shoulder portions 58-1 and 58-2 are end portions on the +Y side of the surface of the click feeling generator 50 surrounding the switch moving body 12 in the direction of the virtual straight line L at the neutral position of the switch moving body 12. It should be noted that, although not illustrated in the drawing, a terminal board with a plurality of fixed contacts laid thereon is provided in the housing of the lever switch 100. As the switch moving body 12 is displaced rotationally, a contact piece provided on the switch moving body 12 slides over the terminal board. The contact piece comes in and out of contact with the plurality of fixed contacts to enable or disable the electrical contact.

Next, a low rigidity portion 60 (60-1, 60-2) that limits the rotation range of the switch moving body 12 is described. The switch moving body 12 has a corner portion 14 (14-1, 14-2). When the corner portion 14-1 on the +X side abuts on the low rigidity portion 60-1, the rotation range of the switch moving body 12 in the +X direction is limited. When the corner portion 14-2 on the −X side abuts on the low rigidity portion 60-2, the rotation range of the switch moving body 12 in the −X direction is limited. Since the click feeling generator 50 is configured substantially symmetrically about the virtual straight line L in the neutral state of the switch moving body 12, the configuration of the low rigidity portion 60-1 is described on behalf of the low rigidity portions 60.

Figure 3:
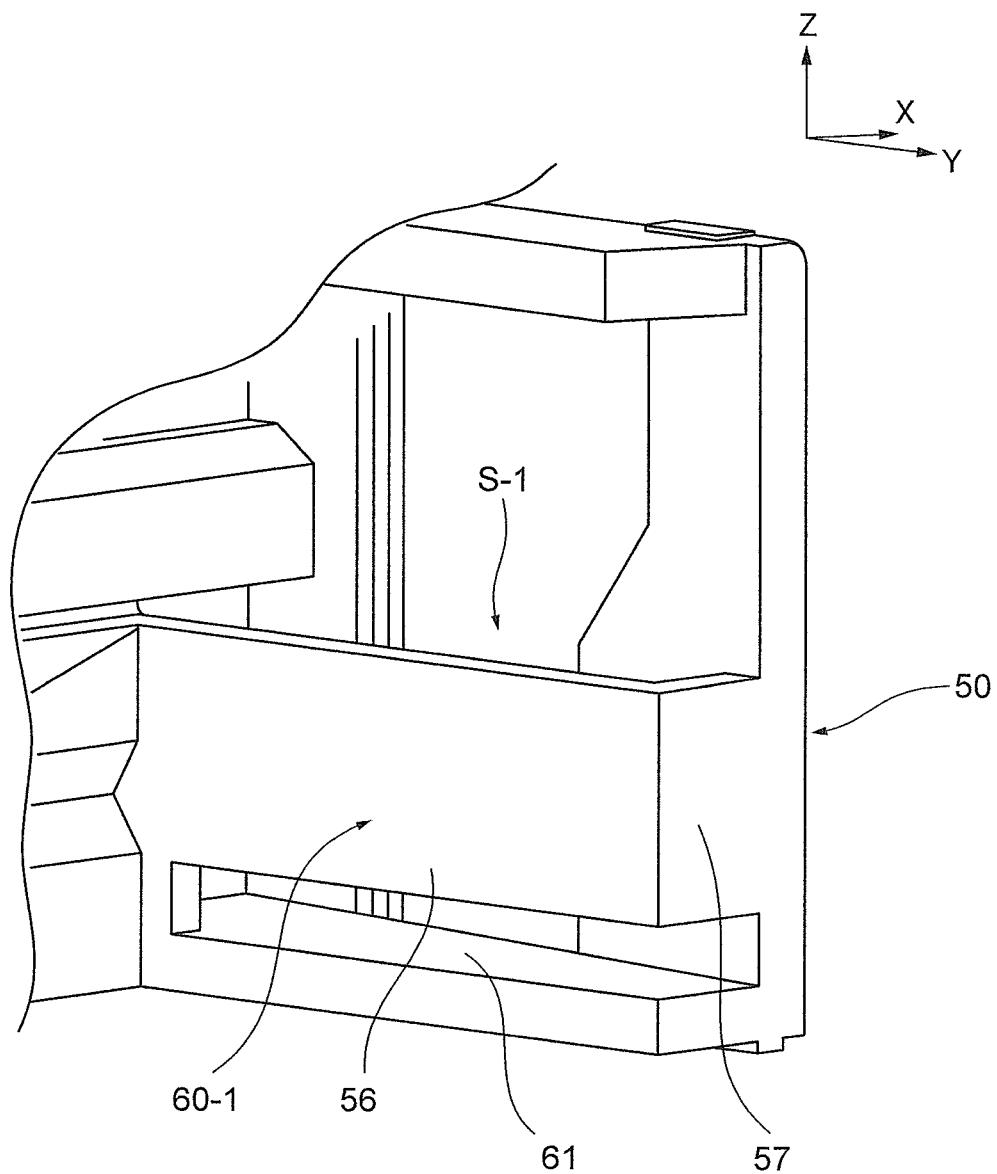
FIG. 3 is a partial perspective view of a low rigidity portion and its periphery.

FIG. 3 is a partial perspective view of the low rigidity portion 60-1 and its surroundings. The low rigidity portion 60-1 is provided between the shoulder portion 58-1 and the clicking surface 51. The click feeling generator 50 includes an abutting wall 56 that abuts the corner portion 14-1 of the switch moving body 12, and a connecting wall 57 that is connected to the abutting wall 56. A space S-1 is arranged facing the side of the abutting wall 56 and the connecting wall 57 opposite to the side thereof abutting the corner portion 14-1. The presence of the space S-1 allows the abutting wall 56 to bend easily toward the space S-1. Thus, the portion of the abutting wall 56 that can bend easily due to abutting the corner portion 14-1 is particularly referred to as a low rigidity portion 60-1. In other words, the low rigidity portion 60-1 is a portion having lower rigidity than the adjacent portions.

A slit 61 is formed on the −Z side of the abutting wall 56 and the connecting wall 57 (see FIG. 3), so that the abutting wall 56 and the connecting wall 57 are connected to the body of the click feeling generator 50 like a beam supported at both ends. Thus, the abutting wall 56 and the connecting wall 57 can bend easily toward the space S-1. According to the length, shape, and position of the slit 61, it is easy to design the abutting wall 56 and the connecting wall 57 to bend easily as desired.

Since the click feeling generator 50 is formed integrally, the abutting wall 56 and the connecting wall 57 are also made of an elastic member such as an elastomer. Further, when the corner portion 14-1 abuts on the low rigidity portion 60-1, the low rigidity portion 60-1 bends. This reduces the collision sound generated when the corner portion 14-1 abuts on the low rigidity portion 60-1 to limit the rotation range of the switch moving body 12. No separate member is necessary for providing the low rigidity portion 60-1 in the click feeling generator 50, so that the increase in the number of parts can be prevented. It should be noted that, for the low rigidity portion 60-2, a space S-2 is arranged similarly facing the side of the abutting wall 56 and the connecting wall 57 opposite to the side thereof abutting the corner portion 14-2. Therefore, it is possible to reduce the collision sound generated when the corner portion 14-2 abuts on the low rigidity portion 60-2 to limit the rotation range of the switch moving body 12.

It should be noted that, as described above, the click feeling generator 50 is disposed in the third case 40 with the clearance CL, and abuts on the third case 40 at the protrusions 59-1 and 59-2. As far as the X-Y plane is concerned, the click feeling generator 50 abuts on the third case 40 only at the protrusions 59-1 and 59-2. Therefore, the abutting force when the corner portions 14-1 and 14-2 abut on the low rigidity portions 60-1 and 60-2 is received by the third case 40 via the protrusions 59-1 and 59-2, respectively. That is, the click feeling generator 50 always abuts on the third case 40 at the same positions to achieve a stable abutting state and stable operation feeling.

Further, in the direction of the virtual straight line L in the neutral state of the switch moving body 12, the positions of the protrusions 59-1 and 59-2 are substantially the same as the shoulder portions 58-1 and 58-2, respectively, and the protrusions 59-1 and 59-2 are located outside the shoulder portions 58-1 and 58-2, respectively. In the direction of the virtual straight line L, the click feeling generator 50 is most largely displaced in the vicinity of the shoulder portions 58-1 and 58-2, so that the fact that the protrusions 59-1 and 59-2 and the shoulder portions 58-1 and 58-2 are at substantially the same position can stabilize the posture of the click feeling generator 50. Further, in the direction of the virtual straight line L in the neutral state of the switch moving body 12, the protrusions 59-1 and 59-2 and the corner portions 14-1 and 14-2 are deviated from each other, as the protrusions 59-1, 59-2 are located toward the +Y direction compared to the positions of the low rigidity portions 60-1, 60-2 abutting on the corner portions 14-1, 14-2. As described above, it is possible to achieve a stable operation feeling by adequately designing the positions of the shoulder portions 58-1 and 58-2 and the protrusions 59-1 and 59-2 and the abutting positions between the low rigidity portions 60-1 and 60-2 and the corner portions 14-1 and 14-2.

According to the present embodiment, the click feeling generator 50 is made integrally of the elastic member, and the click feeling generator 50 includes the low rigidity portion 60 formed between the clicking surfaces 51 and 52 and the shoulder portions 58-1 and 58-2. The corner portion 14 of the switch moving body 12 abuts on the corresponding low rigidity portion 60 in the rotation direction to limit the rotation range of the switch moving body 12. Therefore, the collision sound generated at the time of rotation of the switch moving body 12 can be reduced while reducing the number of parts.

Further, the click feeling generator 50 is disposed in the third case 40 with the clearance CL, and abuts on the third case 40 by the protrusions 59-1 and 59-2. This stabilizes the state and position of the click feeling generator 50 abutting on the third case 40, and further stabilizes the operation feeling. Further, the presence of the clearance CL helps interrupting transmission of the impact generated in the click feeling generator 50 to the third case 40, and accordingly decreases the vibrations of the third case 40 and impedes diffusion of the impact sound.

Further, in the direction of the virtual straight line L in the neutral state of the switch moving body 12, the protrusions 59-1 and 59-2 and the shoulder portions 58-1 and 58-2 are located at substantially the same positions. This stabilizes the posture of the click feeling generator 50 when the corner portion 14 abuts on the corresponding low rigidity portion 60 and stabilizes the operation feeling.

Figure 4:
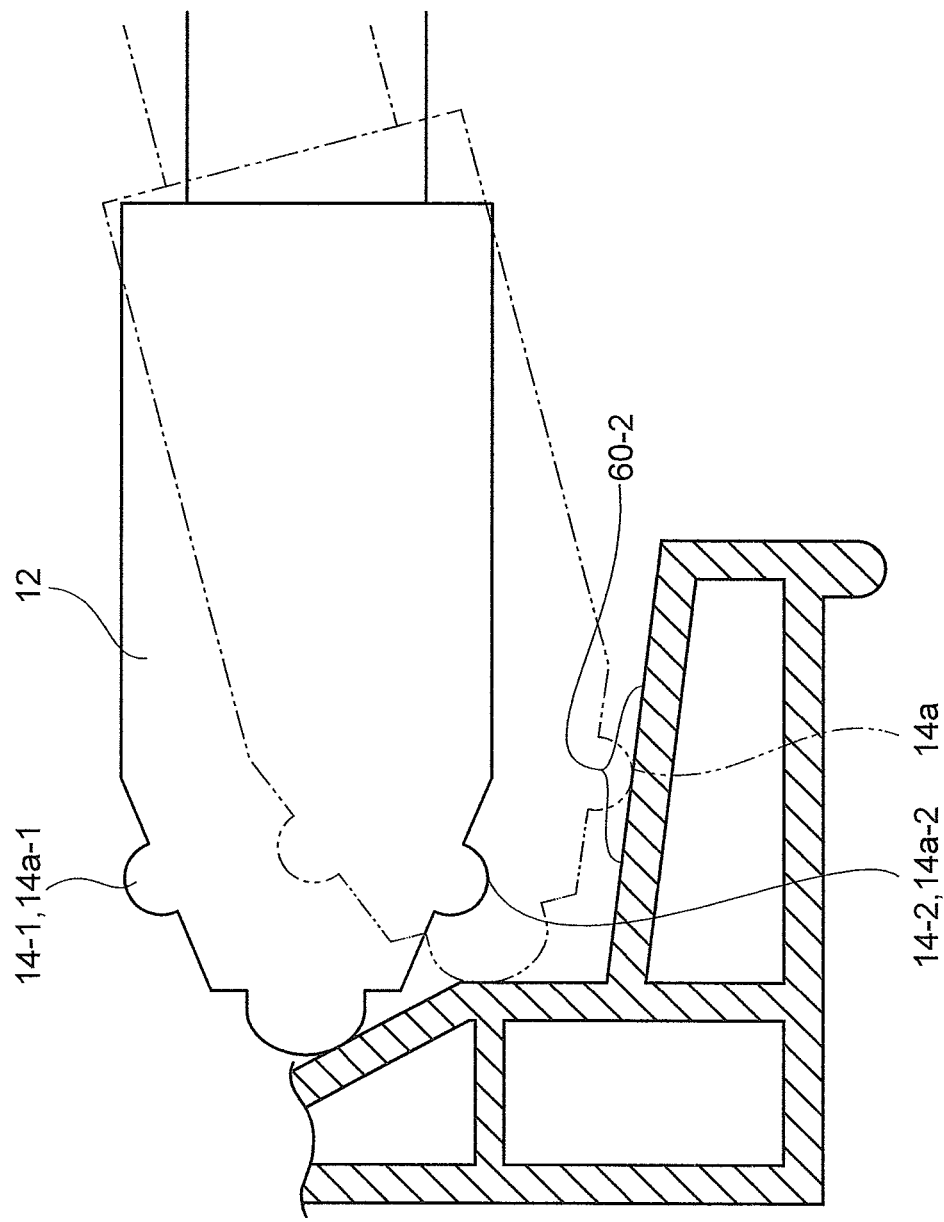
FIG. 4 is a schematic cross-sectional view showing a switch moving body of a variation.

Variations are described with reference to FIGS. 4 and 5. FIG. 4 is a schematic cross-sectional view showing the switch moving body 12 of a variation. In this example, the corner portions 14-1 and 14-2 of the switch moving body 12 have protruding abutting portions 14a-1 and 14a-2 for abutting on the corresponding low rigidity portions 60. This stabilizes the position at which the corner portion 14 of the switch moving body 12 abuts on the low rigidity portion 60, thus stabilizing the rotation range limiting operation.

Figure 5:
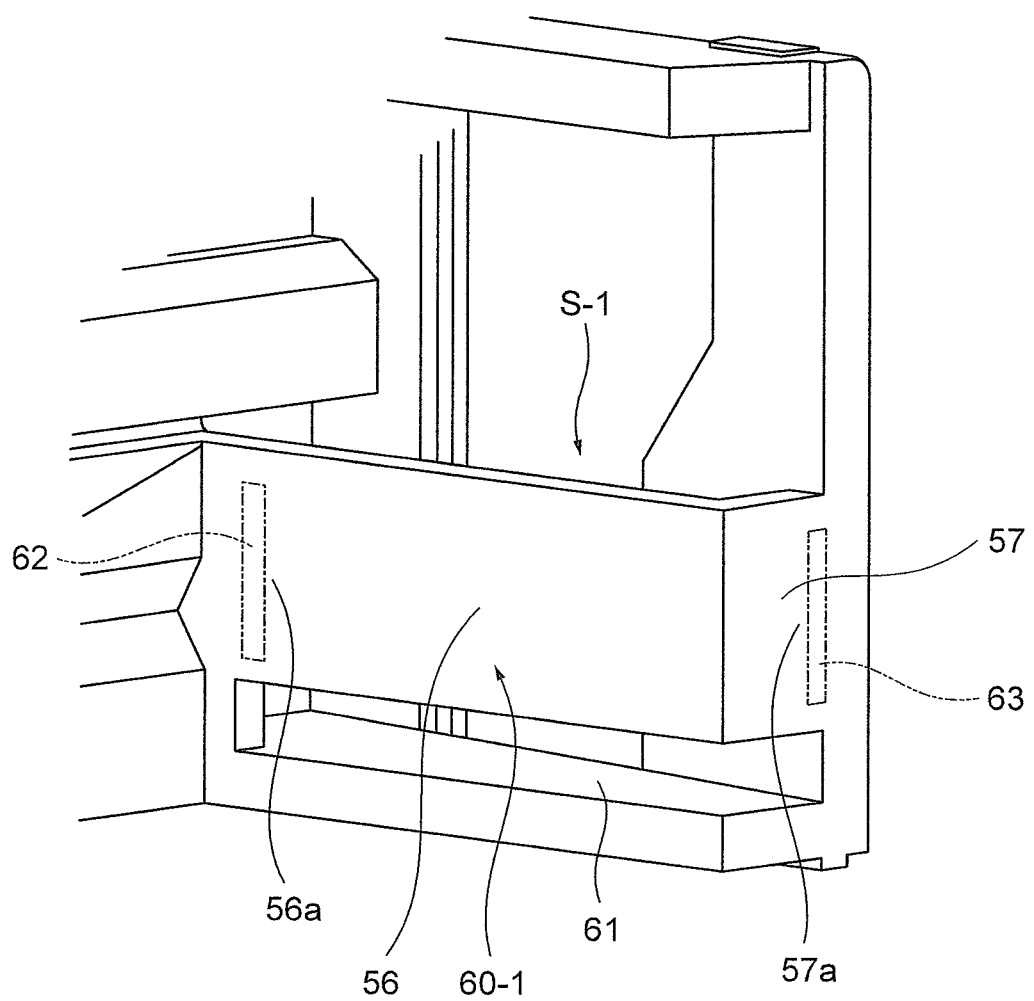
FIG. 5 is a perspective view of a low rigidity portion and its periphery of the variation.

FIG. 5 is a perspective view of the low rigidity portion 60-1 and its periphery of the variation. The slit 61 is formed in the example of FIG. 3 to support the abutting wall 56 and the connecting wall 57 are supported on the body of the click feeling generator 50 at both ends 56a and 57a serving as the supporting portions. Alternatively, in a variation of FIG. 5, at least one of a slit 62 and a slit 63 may be formed in the support portion. The slit 62 is formed in the vicinity of the end portion 56a, and the slit 63 is formed in the vicinity of the end portion 57a. Both of the slits 62 and 63 are through holes connecting to the space S-1 from the side abutting on the corner portion 14-1 of the abutting wall 56. Not only the slit 61 but also the lengths, shapes, and arrangement positions of the slits 62 and 63 make it easier to design the abutting wall 56 and the connecting wall 57 to bend easily as desired.

It should be noted that the slits 62 and 63 are examples of a fragile portion in the present invention, but various forms such as forming notches or thin body portions can be adopted as the fragile portion instead of the slits so long as the flexibility of the abutting wall 56 when abutted by the corner portion 14 is appropriately changeable.

Although the present invention has been described in detail in accordance with the preferred embodiments, the present invention is not limited to these specific embodiments, and various other forms within the scope of the present invention are also included in the present invention.

This application claims the benefit of Japanese Patent Application No. 2019-041776 filed on Mar. 7, 2019 which is hereby incorporated by reference herein in its entirety.

What is claimed is:

1. A lever switch comprising:
a case;
a click feeling generator that is disposed inside the case and made of an elastic member; and
a switch moving body that is disposed inside the click feeling generator and rotates with respect to the case by operation of an operation lever, wherein
the click feeling generator includes a clicking surface abutting on a tip end of the switch moving body and imparting a click feeling, a shoulder portion formed at an inner end of the click feeling generator, and a low rigidity portion formed between the shoulder portion and the clicking surface,
the click feeling generator is disposed in the case with a clearance, and
a corner portion of the switch moving body in a rotating direction thereof abuts on the low rigidity portion to limit a rotation range of the switch moving body.

2. The lever switch according to claim 1, wherein the low rigidity portion includes an abutting wall abutting on the corner portion of the switch moving body, and a space arranged facing a side of the abutting wall opposite to another side thereof abutting the corner portion.

3. The lever switch according to claim 2, wherein when abutted by the corner portion, the abutting wall is supported at both ends to bend toward the space.

4. The lever switch according to claim 1, wherein the click feeling generator has an external protrusion, and the click feeling generator abuts on the case at the protrusion.

5. The lever switch according to claim 4, wherein the switch moving body is rotatable bidirectionally from a neutral position, and
the protrusion is provided at a position substantially identical to the position of the shoulder portion of the click feeling generator in a direction of a virtual straight line which passes through the tip end of the switch moving body positioned at the neutral position and a rotation center of the switch moving body.

6. The lever switch according to claim 5, wherein in the direction of the virtual straight line when the switch moving body is positioned at the neutral position, a position of the low rigidity portion abutting on the corner portion of the switch moving body differs from a position of the protrusion of the click feeling generator.

7. The lever switch according to claim 1, wherein the corner portion has a protruding abutting portion that abuts on the low rigidity portion.

8. The lever switch according to claim 2, wherein the abutting wall is supported to bend toward the space when abutted by the corner portion, and a fragile portion that bends more easily than the abutting wall is formed at a portion where the abutting wall is supported.

* * * * *